(12) United States Patent
Choi et al.

(10) Patent No.: US 8,947,895 B2
(45) Date of Patent: Feb. 3, 2015

(54) TWO-PEAK CURRENT CONTROL FOR FLYBACK VOLTAGE CONVERTERS

(75) Inventors: Jinho Choi, Saratoga, CA (US); Hao Peng, Sunnyvale, CA (US); Wanfeng Zhang, Palo Alto, CA (US); Tuyen Doan, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 265 days.

(21) Appl. No.: 13/404,584

(22) Filed: Feb. 24, 2012

(65) Prior Publication Data

US 2012/0230065 A1 Sep. 13, 2012

Related U.S. Application Data

(60) Provisional application No. 61/451,003, filed on Mar. 9, 2011, provisional application No. 61/454,442, filed on Mar. 18, 2011.

(51) Int. Cl.
| | |
|---|---|
| *G05F 1/00* | (2006.01) |
| *H02M 3/335* | (2006.01) |
| *H02M 1/42* | (2007.01) |
| *H05B 33/08* | (2006.01) |
| *H02M 1/00* | (2006.01) |

(52) U.S. Cl.
CPC ........ *H02M 3/33523* (2013.01); *H02M 1/4258* (2013.01); *H05B 33/0815* (2013.01); *H02M 2001/0022* (2013.01); *Y02B 20/347* (2013.01); *Y02B 70/126* (2013.01)
USPC .......... 363/21.18; 323/274; 323/284

(58) Field of Classification Search
USPC ........ 323/274, 284, 287; 363/21.01, 363/21.09–21.11, 21.18, 56.01, 56.1, 97
See application file for complete search history.

(56) References Cited

U.S. PATENT DOCUMENTS

| | | | |
|---|---|---|---|
| 4,928,472 A | 5/1990 | Chang | |
| 5,335,162 A * | 8/1994 | Martin-Lopez et al. | ........ 363/97 |
| 6,721,192 B1 * | 4/2004 | Yang et al. | ........... 363/21.18 |
| 7,054,171 B1 * | 5/2006 | Bailly et al. | ........... 363/21.08 |
| 7,099,163 B1 * | 8/2006 | Ying | ........... 363/21.11 |
| 7,433,211 B1 | 10/2008 | Collmeyer et al. | |
| 7,579,818 B2 * | 8/2009 | Ball et al. | ........... 323/284 |

(Continued)

FOREIGN PATENT DOCUMENTS

CN 101777848 7/2010

OTHER PUBLICATIONS

International Search Report and Written Opinion for related PCT Application No. PCT/US2012/026687; Mar. 11, 2013; 8 pages.

*Primary Examiner* — Adolf Berhane
*Assistant Examiner* — Gary Nash

(57) ABSTRACT

A system including a switch configured to supply power to a load. A first comparator is configured to compare a first current through the switch to a first threshold. A second comparator is configured to compare the first current through the switch to a second threshold. The second threshold is greater than the first threshold. A current control module is configured to turn off the switch (i) for a first duration in response to the first current through the switch being greater than or equal to the first threshold and (ii) for a second duration in response to the first current through the switch being greater than or equal to the second threshold. The current control module is configured to adjust the second duration based on a difference between an estimated current through the load and a desired current through the load.

11 Claims, 4 Drawing Sheets

(56) References Cited

U.S. PATENT DOCUMENTS

| | | | |
|---|---|---|---|
| 7,738,265 B2* | 6/2010 | Trattler | 363/20 |
| 2004/0257839 A1* | 12/2004 | Yang et al. | 363/21.12 |
| 2006/0017424 A1* | 1/2006 | Wood et al. | 323/274 |
| 2007/0041225 A1* | 2/2007 | Fahlenkamp | 363/21.01 |
| 2007/0247879 A1* | 10/2007 | Yang | 363/49 |
| 2008/0143311 A1* | 6/2008 | Yang | 323/284 |
| 2008/0291701 A1* | 11/2008 | Lin | 363/21.1 |
| 2009/0303756 A1 | 12/2009 | Huang et al. | |
| 2010/0085776 A1* | 4/2010 | Mimura | 363/15 |

* cited by examiner

US 8,947,895 B2

TWO-PEAK CURRENT CONTROL FOR FLYBACK VOLTAGE CONVERTERS

CROSS-REFERENCE TO RELATED APPLICATIONS

This application claims the benefit of U.S. Provisional Application No. 61/451,003, filed on Mar. 9, 2011, and U.S. Provisional Application No. 61/454,442, filed on Mar. 18, 2011. The disclosures of the above applications are incorporated herein by reference in their entirety.

FIELD

The present disclosure relates generally to power supplies and more particularly to controlling output current of flyback voltage converters supplied to LED-based illumination systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Flyback voltage converters are used to convert AC line voltage into DC voltage. The DC voltage can be supplied to systems including LED-based illumination systems. The output of the flyback voltage converters can be sensitive to line voltage imbalances and can have large total harmonic distortion (THD). For example, the line voltage can become unbalanced due to unequal system impedances and/or unequal distribution of single-phase loads. Unbalanced line voltage can cause flicker in the light output by LEDs in an LED-based illumination system. Further, the THD can cause transformer heating, secondary voltage distortion, increased power losses, interference with communication systems, and so on.

SUMMARY

A system includes a switch configured to supply power to a load in response to the switch being turned on by pulse width modulation pulses. A first comparator is configured to compare a first current through the switch to a first threshold. A second comparator is configured to compare the first current through the switch to a second threshold. The second threshold is greater than the first threshold. A current control module is configured to turn off the switch (i) for a first duration in response to the first current through the switch being greater than or equal to the first threshold and (ii) for a second duration in response to the first current through the switch being greater than or equal to the second threshold. The current control module is configured to adjust the second duration based on a difference between an estimated current through the load and a desired current through the load.

In other features, the power is generated based on an AC voltage, and the adjustment of the second duration prevents variation of a second current through the load due to an imbalance in the AC voltage.

In other features, the power is generated based on an AC voltage having a predetermined period, and the current control module is configured to reduce a total harmonic distortion in a second current through the load by limiting the second duration to (i) greater than or equal to one-fifth of half the predetermined period and (ii) less than or equal to one-third of half the predetermined period.

In still other features, a method includes supplying power to a load through a switch in response to the switch being turned on by pulse width modulation pulses. The method further includes comparing a first current through the switch to a first threshold and comparing the first current through the switch to a second threshold. The second threshold is greater than the first threshold. The method further includes turning off the switch for a first duration in response to the first current through the switch being greater than or equal to the first threshold. The method further includes turning off the switch for a second duration in response to the first current through the switch being greater than or equal to the second threshold. The method further includes adjusting the second duration based on a difference between an estimated current through the load and a desired current through the load.

In other features, the method further includes generating the power based on an AC voltage, and preventing variation of a second current through the load due to an imbalance in the AC voltage by adjusting the second duration.

In other features, the method further includes generating the power based on an AC voltage having a predetermined period, and reducing a total harmonic distortion in a second current through the load by limiting the second duration to (i) greater than or equal to one-fifth of half the predetermined period and (ii) less than or equal to one-third of half the predetermined period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The present disclosure relates to controlling output current of flyback voltage converters. The flyback voltage converters according to the present disclosure output a constant current despite imbalances in line voltage. Specifically, the output current is maintained at a desired value by providing a fixed amount of current and a variable amount of current. The variable amount of current is controlled within a predetermined range to reduce the total harmonic distortion (THD) in the output current to less than a predetermined level.

Figure 1A:
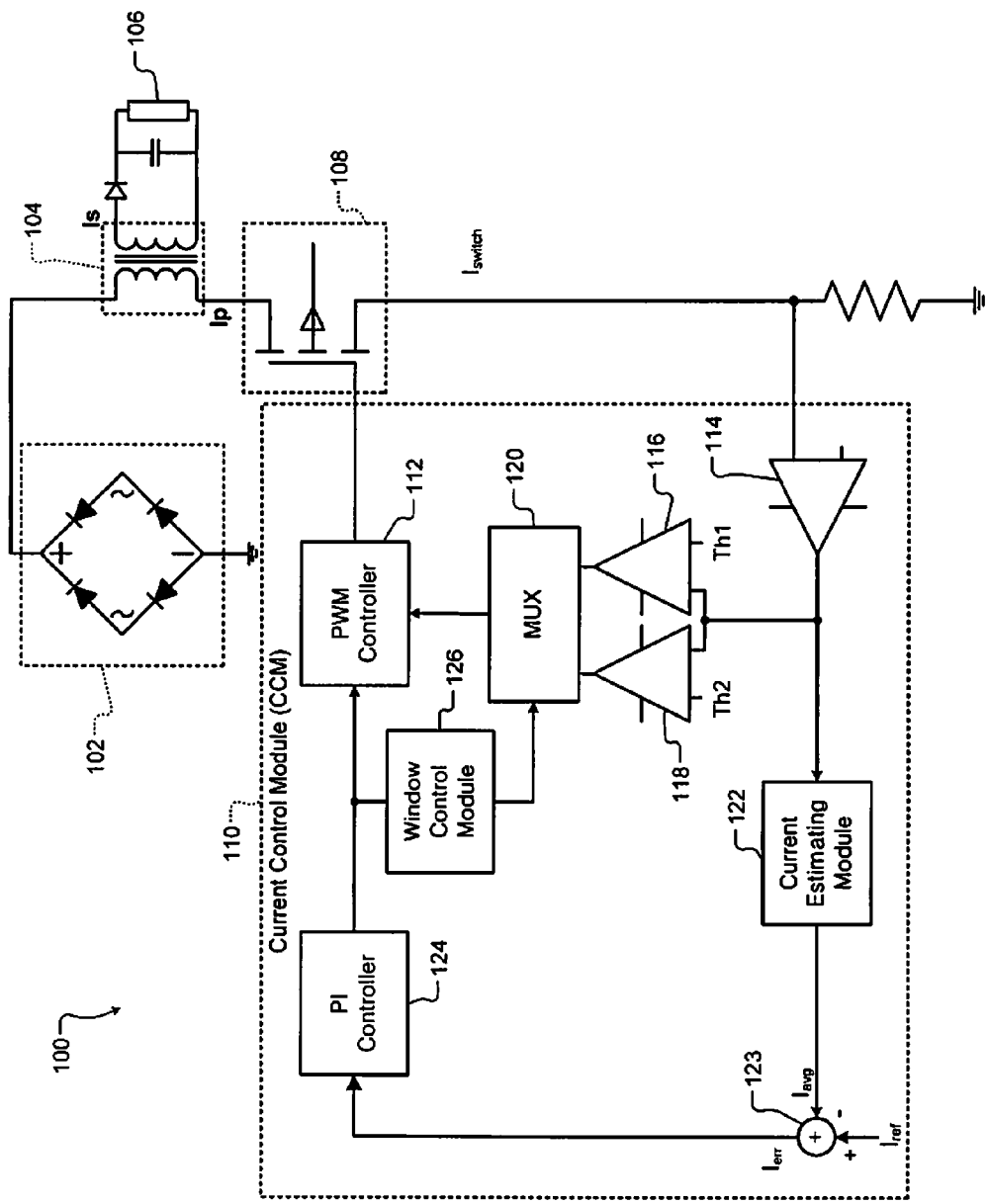
FIG. 1A depicts a flyback voltage converter according to the present disclosure.
Figure 1B:
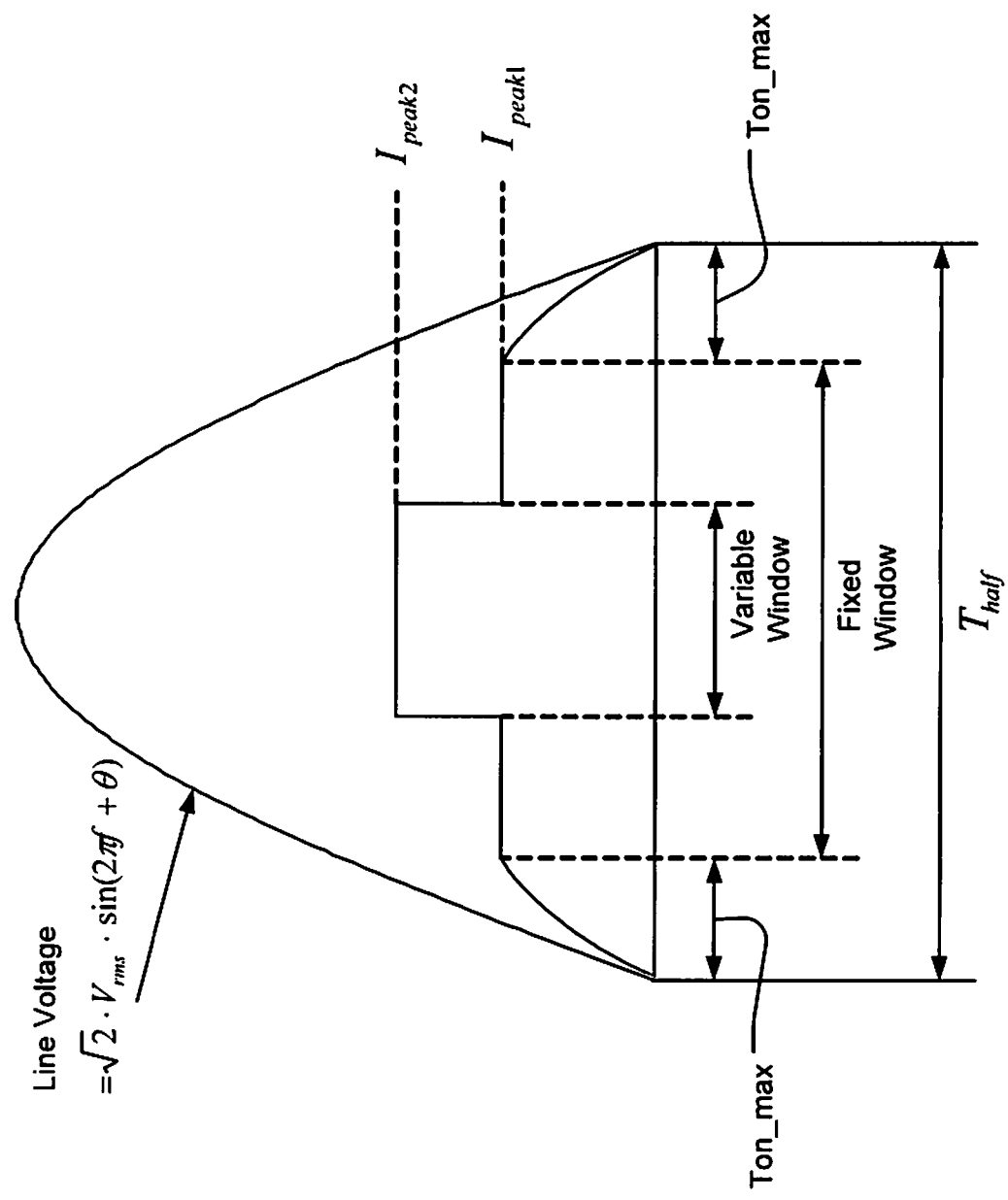
FIG. 1B depicts a half cycle of an AC line voltage and windows for controlling current through a load according to the present disclosure.

Referring now to FIGS. 1A and 1B, a flyback voltage converter 100 according to the present disclosure is shown. In FIG. 1A, the flyback voltage converter 100 includes a bridge rectifier 102 that rectifies AC line voltage into a DC voltage. A flyback transformer 104 couples the output of the bridge rectifier 102 to a load 106. A switch 108 (e.g. a MOSFET) controls the current supplied to the load 106 by the flyback transformer 104.

A current control module 110 controls the switch 108. The current control module 110 includes a pulse width modulation (PWM) controller 112 that generates PWM pulses to control the switch 108. The current through the switch 108 represents the current supplied to the load 106. An amplifier 114 amplifies the current through the switch 108. The output of the amplifier 114 is input to a first comparator 116 and a second comparator 118. The first comparator 116 compares the output of the amplifier 114 to a first threshold (Th1), which is set to a first peak current value $I_{peak1}$ shown in FIG. 1B. The second comparator 118 compares the output of the amplifier 114 to a second threshold (Th2), which is set to a second peak current value $I_{peak2}$ shown in FIG. 1B. The second peak current value $I_{peak2}$ is greater than the first peak current value $I_{peak1}$ as shown in FIG. 1B.

The current control module 110 controls the current supplied to the load 106 by varying the width of the variable window shown in FIG. 1B as follows. As the AC line voltage increases, the current through the switch 108, which represents the current through the load 106, increases. The first comparator 116 outputs a first control signal when the current through the switch 108 becomes greater than or equal to the first peak current value $I_{peak1}$. The second comparator 118 outputs a second control signal when the current through the switch 108 becomes greater than or equal to the second peak current value $I_{peak2}$. The first control signal and the second control signal are input to a multiplexer 120. The multiplexer 120 is controlled by a window control module 126. The output of the multiplexer 120 is used by the PWM controller 112 to turn off the switch 108.

The window control module 126 controls the output of the multiplexer 120 as follows. A current estimating module 122 estimates the current supplied to the load 106, $I_{avg}$, based on the output of the amplifier 114. A difference generator 123 generates a difference, $I_{err}$, between the estimated current supplied to the load 106, $I_{avg}$, and a reference current $I_{ref}$. The reference current $I_{ref}$ represents the desired current through the load 106. The difference is input to a proportional integral (PI) controller 124.

Based on the difference $I_{err}$, the window control module 126 selects the first control signal output by the first comparator 116 or the second control signal output by the second comparator 118. Additionally, based on the difference, the window control module 126 determines the duration for which the second control signal output by the second comparator 118 is selected (i.e., the duration of the variable window shown in FIG. 1B). The PWM controller 112 turns off the switch 108 based on the first control signal or the second control signal selected by the window control module 126.

Specifically, when the estimated current supplied to the load 106, $I_{avg}$, is less than the reference current $I_{ref}$, based on the difference $I_{err}$, the window control module 126 increases the duration of the variable window shown in FIG. 1B by increasing the duration for which the output of the second comparator 118 is selected. Accordingly, the switch 108 is turned off when the current through the switch 108 becomes greater than or equal to the second peak current value $I_{peak2}$ and not when the current through the switch 108 becomes greater than or equal to the first peak current value $I_{peak1}$. Since the turn-off threshold for the switch 108 is increased for a longer duration, more power (i.e., more current) is delivered to the load 106.

Conversely, when the estimated current supplied to the load 106, $I_{avg}$, is greater than the reference current $I_{ref}$, based on the difference $I_{err}$, the window control module 126 decreases the duration of the variable window shown in FIG. 1B by decreasing the duration for which the output of the second comparator 118 is selected. Accordingly, the switch 108 is turned off when the current through the switch 108 becomes greater than or equal to the second peak current value $I_{peak2}$ for a shorter duration. Since the turn-off threshold for the switch 108 is increased for a shorter duration, less power (i.e., less current) is delivered to the load 106. Thus, the current through the load 106 is maintained at the reference current $I_{ref}$ irrespective of variation in the DC voltage caused by unbalanced AC line voltage.

Additionally, the total harmonic distortion (THD) in the current through the load 106 can be reduced by controlling the duration of the variable window (i.e., the duration for which the second control signal output by the second comparator 118 is selected). For example, the THD can be reduced to less than 20% by maintaining the duration of the variable window between $\frac{1}{5}^{th}$ and $\frac{1}{3}^{rd}$ of half the period ($T_{half}/2$) of the AC line voltage.

Figure 2:
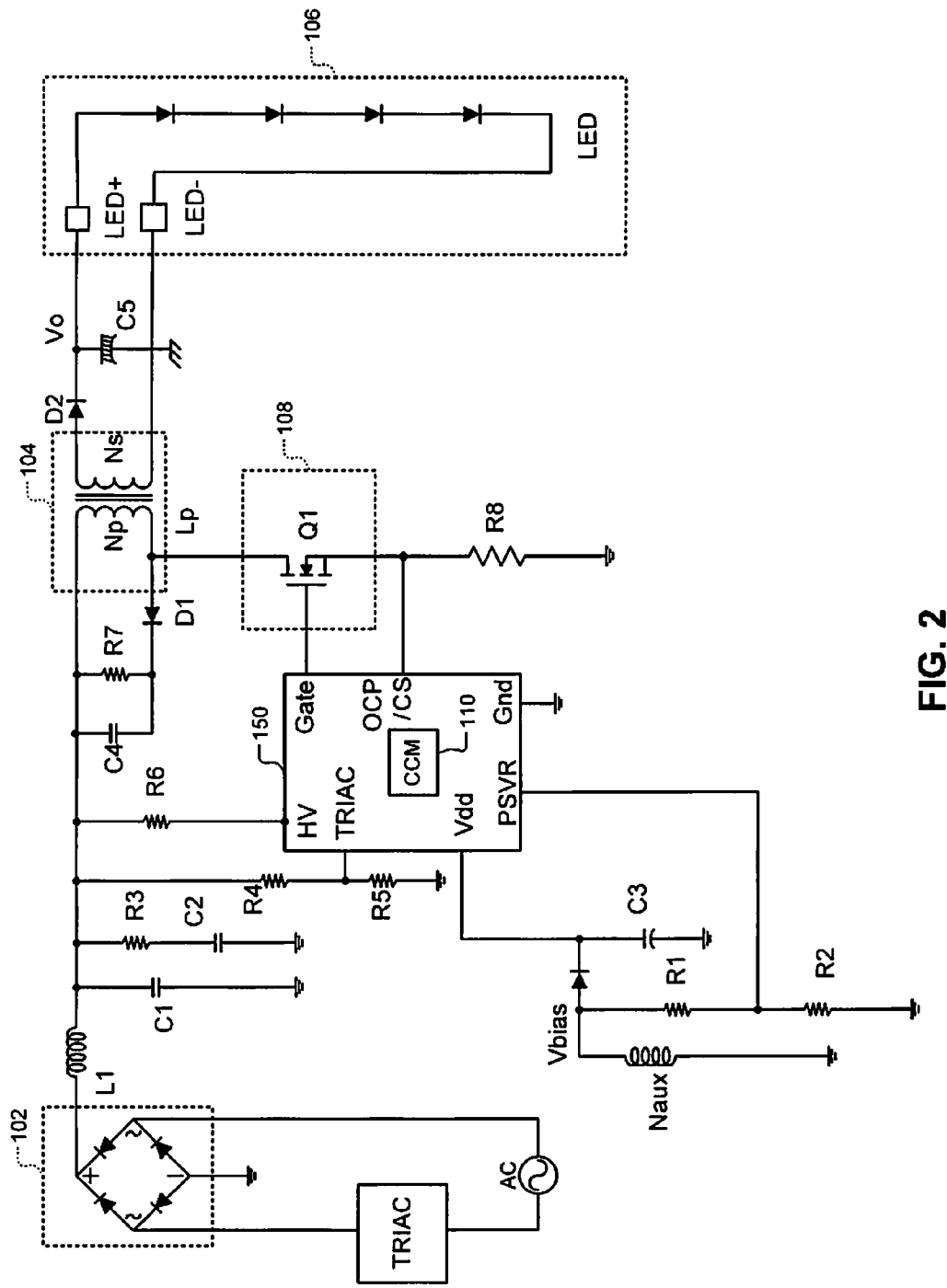
FIG. 2 depicts a circuit for controlling current through LEDs according to the present disclosure.

Referring now to FIG. 2, a circuit for controlling current through LEDs according to the present disclosure is shown. The circuit includes all of the components shown in FIG. 1A. The circuit includes a TRIAC for dimming the LEDs. The circuit includes an integrated circuit 150 that includes the current control module 110. The integrated circuit 150 controls the TRIAC. In the circuit, PSVR indicates primary side voltage regulation, OCP/CS indicates over-current protection/current sensing, and $N_p$ and $N_s$ respectively indicate the number of turns of the primary and second windings of the flyback transformer 104. While the load 106 is shown to include only four LEDs, the load 106 may include any number of LEDs.

Figure 3:
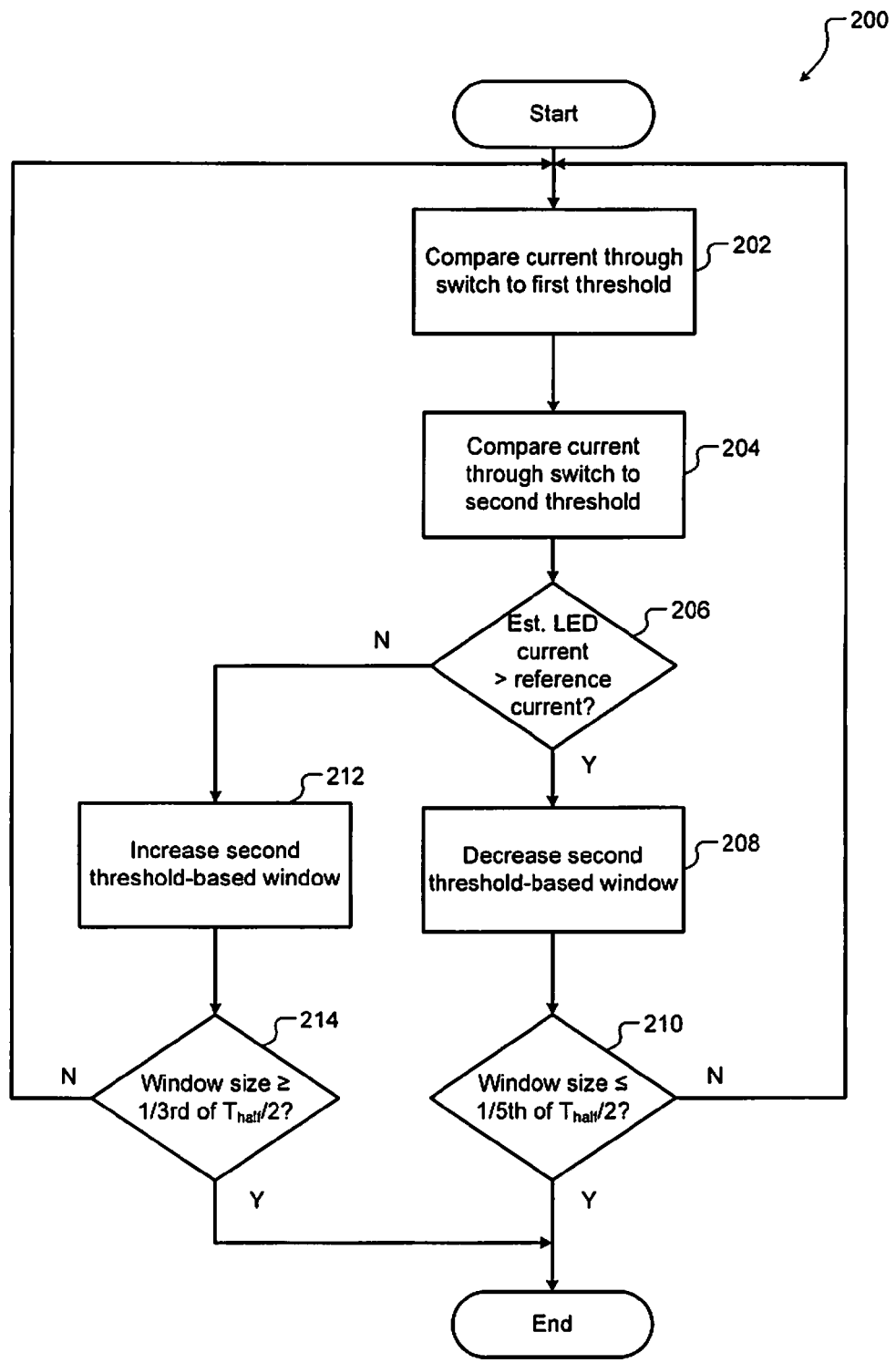
FIG. 3 is a flowchart of a method for controlling current through LEDs according to the present disclosure.

Referring now to FIG. 3, a method 200 for controlling LED current according to the present disclosure is shown. At 202, control compares the current through the switch 108 to a first threshold. At 204, control compares the current through the switch 108 to a second threshold. At 206, control determines whether an estimated LED current is greater than a reference current (i.e., a desired current). At 208, if the estimated LED current is greater than the reference current, control decreases the variable window to reduce power (and current) delivered to the LEDs. At 210, control determines if the window size is less than or equal to $\frac{1}{5}^{th}$ of half the period ($T_{half}/2$) of the AC line voltage. Control returns to 202 if the window size is not less than or equal to 115$^{th}$ of half the period ($T_{half}/2$) of the AC line voltage. Control ends if the window size is less than or equal to $\frac{1}{5}^{th}$ of half the period ($T_{half}/2$) of the AC line voltage.

At 212, if the estimated LED current is less than the reference current, control increases the variable window to increase power (and current) delivered to the LEDs. At 214, control determines if the window size is greater than or equal to $\frac{1}{3}^{rd}$ of half the period ($T_{half}/2$) of the AC line voltage. Control returns to 202 if the window size is not greater than or equal to $\frac{1}{3}^{rd}$ of half the period ($T_{half}/2$) of the AC line voltage. Control ends if the window size is greater than or equal to $\frac{1}{3}^{rd}$ of half the period ($T_{half}/2$) of the AC line voltage. Thus, the current delivered to the LEDs is maintained at the reference current irrespective of variation in the AC line voltage. Additionally, the THD is reduced to less than 20% by maintaining the duration of the variable window between $\frac{1}{5}^{th}$ and $\frac{1}{3}^{rd}$ of half the period ($T_{half}/2$) of the AC line voltage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a switch configured to supply power to a load in response to the switch being turned on by pulse width modulation pulses;
a first comparator configured to compare a first current through the switch to a first threshold and generate a first output in response to the first current being greater than or equal to the first threshold;
a second comparator configured to compare the first current through the switch to a second threshold and generate a second output in response to the first current being greater than or equal to the second threshold, wherein the second threshold is greater than the first threshold;
a current estimating module configured to determine an estimated current through the load based on the first current through the switch; and
a current control module configured to
select the first output or the second output,
turn off the switch based on the first output or the second output, and
adjust a duration for which the second output is selected based on a difference between the estimated current through the load and a desired current through the load.

2. The system of claim 1, wherein:
the power is generated based on an AC voltage, and
the adjustment of the duration for which the second output is selected prevents variation of a second current through the load due to an imbalance in the AC voltage.

3. The system of claim 1, wherein:
the power is generated based on an AC voltage having a predetermined period, and
the current control module is configured to reduce a total harmonic distortion in a second current through the load by limiting the duration for which the second output is selected to (i) greater than or equal to one-fifth of half the predetermined period and (ii) less than or equal to one-third of half the predetermined period.

4. The system of claim 1, further comprising:
a pulse width modulation controller configured to generate the pulse width modulation pulses; and
a multiplexer configured to receive as inputs (i) the first output of the first comparator and (ii) the second output of the second comparator,
wherein the current control module is configured generate a control signal to control the multiplexer based on the difference between the estimated current through the load and the desired current through the load,
wherein the multiplexer is configured to output (i) the first output of the first comparator or (ii) the second output of the second comparator based on the control signal, and
wherein the pulse width modulation controller is configured to turn off the switch based on (i) the first output of the first comparator or (ii) the second output of the second comparator output by the multiplexer.

5. The system of claim 1, further comprising:
a bridge rectifier configured to convert an AC voltage into a DC voltage;
a transformer configured to couple the DC voltage to the load, wherein the switch is connected in series with a primary winding of the transformer, and wherein the load is connected across a secondary winding of the transformer;
a current estimating module configured to determine the estimated current through the load based on the first current through the switch;
a pulse width modulation controller configured to generate the pulse width modulation pulses; and
a multiplexer configured to receive as inputs (i) the first output of the first comparator and (ii) the second output of the second comparator,
wherein the current control module is configured generate a control signal to control the multiplexer based on the difference between the estimated current through the load and the desired current through the load,
wherein the multiplexer is configured to output (i) the first output of the first comparator or (ii) the second output of the second comparator based on the control signal, and
wherein the pulse width modulation controller is configured to turn off the switch based on (i) the first output of the first comparator or (ii) the second output of the second comparator output by the multiplexer.

6. The system of claim 1, wherein in response to the estimated current through the load being less than the desired current through the load, based on difference between the estimated current through the load and the desired current through the load, the current control module is configured to:
increase the duration for which the second output is selected, and
turn off the switch when the first current through the switch becomes greater than or equal to the second threshold and not when the first current through the switch becomes greater than or equal to the first threshold.

7. The system of claim 1, wherein in response to the estimated current through the load being greater than the desired current through the load, based on difference between the estimated current through the load and the desired current through the load, the current control module is configured to:
decrease the duration for which the second output is selected, and
turn off the switch when the first current through the switch becomes greater than or equal to the second threshold.

8. A method comprising:
supplying power to a load through a switch in response to the switch being turned on by pulse width modulation pulses;
comparing a first current through the switch to a first threshold and generating a first output in response to the first current being greater than or equal to the first threshold;
comparing the first current through the switch to a second threshold and generating a second output in response to the first current being greater than or equal to the second threshold, wherein the second threshold is greater than the first threshold;
determining an estimated current through the load based on the first current through the switch;
select the first output or the second output,
turning off the switch based on the first output or the second output; and
adjusting a duration for which the second output is selected based on a difference between the estimated current through the load and a desired current through the load.

9. The method of claim 8, further comprising:
generating the power based on an AC voltage; and
preventing variation of a second current through the load due to an imbalance in the AC voltage by adjusting the duration for which the second output is selected.

10. The method of claim 8, further comprising:
generating the power based on an AC voltage having a predetermined period; and
reducing a total harmonic distortion in a second current through the load by limiting the duration for which the second output is selected to (i) greater than or equal to one-fifth of half the predetermined period and (ii) less than or equal to one-third of half the predetermined period.

11. The method of claim 8, further comprising:
converting an AC voltage into a DC voltage;
coupling the DC voltage to the load by a transformer;
connecting the switch in series with a primary winding of the transformer;
connecting the load across a secondary winding of the transformer;
determining the estimated current through the load based on the first current through the switch; and
generating the pulse width modulation pulses.

* * * * *